(12) United States Patent
Vandikas et al.

(10) Patent No.: US 10,163,340 B2
(45) Date of Patent: Dec. 25, 2018

(54) METHODS AND NETWORK NODES FOR NOTIFYING VEHICLE DRIVERS ABOUT THEIR DRIVING

(71) Applicant: TELEFONAKTIEBOLAGET LM ERICSSON (PUBL), Stockholm (SE)

(72) Inventors: Konstantinos Vandikas, Solna (SE); Manfred Dasselaar, Knivsta (SE); Vlasios Tsiatsis, Solna (SE); Nina Washington, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/313,505

(22) PCT Filed: May 26, 2014

(86) PCT No.: PCT/SE2014/050642
§ 371 (c)(1),
(2) Date: Nov. 22, 2016

(87) PCT Pub. No.: WO2015/183143
PCT Pub. Date: Dec. 3, 2015

(65) Prior Publication Data
US 2017/0193819 A1 Jul. 6, 2017

(51) Int. Cl.
*G08G 1/01* (2006.01)
*G08G 1/052* (2006.01)
(Continued)

(52) U.S. Cl.
CPC .......... *G08G 1/0141* (2013.01); *B60W 30/16* (2013.01); *G08G 1/0133* (2013.01); *G08G 1/052* (2013.01);
(Continued)

(58) Field of Classification Search
CPC ....... G08G 1/01; G08G 1/0104; G08G 1/0112
(Continued)

(56) References Cited

U.S. PATENT DOCUMENTS 8,185,300 B2 * 5/2012 Miura .................... G01C 21/26
340/425.5
8,918,243 B2 * 12/2014 Mitchell .............. G06Q 10/063
340/438
(Continued)

FOREIGN PATENT DOCUMENTS

EP 2343208 A1 7/2011

OTHER PUBLICATIONS

Adaptive personalization of multimodal vehicular interfaces using a hybrid recommendation approach with fuzzy preferences; Philipp Fischer; Michael Cebulla; Andre Berton; Andreas Nurnberger; Sandro Rodriguez Garzon; 2008 IEEE Intelligent Vehicles Symposium; Year: 2008; pp. 209-213.*
(Continued)

*Primary Examiner* — Cuong H Nguyen
(74) *Attorney, Agent, or Firm* — Rothwell, Figg, Ernst & Manbeck, P.C.

(57) ABSTRACT

The disclosure relates to a method (50) performed in a network node (3, 4, 5) for notifying a driver of a vehicle (7) about his or her driving. The method (50) comprises receiving (51) vehicle related information from a communication device (6) capable of receiving data from a data collector (8) of the vehicle (7); processing (52) the vehicle related information such as to establish a driving indicator of a driver of the vehicle (7) in relation to one or more other drivers; and transmitting (53) to the communication device (6) data indicating the driving indicator of the driver of the vehicle (7) in relation to other drivers. The disclosure also relates to a corresponding network node, computer program and com-
(Continued)

puter program products. The disclosure further relates to a method in a communication device.

17 Claims, 7 Drawing Sheets

(51) Int. Cl.
    *G08G 1/123* (2006.01)
    *G08G 1/0962* (2006.01)
    *B60W 30/16* (2012.01)
    *G08G 1/0967* (2006.01)
    *G08G 1/00* (2006.01)

(52) U.S. Cl.
    CPC ... *G08G 1/09626* (2013.01); *G08G 1/096741* (2013.01); *G08G 1/123* (2013.01); *G08G 1/22* (2013.01)

(58) Field of Classification Search
    USPC .............. 701/117, 425.5, 33.4, 25; 340/441, 340/438–439, 576
    See application file for complete search history.

(56) References Cited

U.S. PATENT DOCUMENTS

| | | | | |
|---|---|---|---|---|
| 2004/0209594 A1* | 10/2004 | Naboulsi | ............ | B60R 11/0264 455/404.1 |
| 2004/0210353 A1* | 10/2004 | Rice | ............ | G01C 21/26 701/1 |
| 2007/0290867 A1* | 12/2007 | Kuramori | ............ | B60Q 9/00 340/576 |
| 2009/0079555 A1* | 3/2009 | Aguirre De Carcer | | G07C 5/008 340/441 |
| 2010/0063725 A1* | 3/2010 | Miura | ............ | G01C 21/26 701/408 |
| 2010/0201816 A1* | 8/2010 | Lee | ............ | B60R 1/12 348/148 |
| 2010/0201896 A1* | 8/2010 | Ostreko | ............ | B60R 1/12 349/1 |
| 2011/0050460 A1* | 3/2011 | Bruns | ............ | H04M 1/6075 340/905 |
| 2011/0205044 A1* | 8/2011 | Enomoto | ............ | B60K 35/00 340/439 |
| 2013/0124038 A1* | 5/2013 | Naboulsi | ............ | B60R 11/0264 701/36 |
| 2013/0179027 A1* | 7/2013 | Mitchell | ............ | G06Q 10/063 701/29.3 |
| 2014/0309849 A1* | 10/2014 | Ricci | ............ | B60Q 1/00 701/33.4 |
| 2015/0127215 A1* | 5/2015 | Chatterjee | ............ | H04W 4/046 701/36 |
| 2015/0211868 A1* | 7/2015 | Matsushita | ............ | G01C 21/32 701/457 |
| 2015/0241235 A1* | 8/2015 | Lobato Fregoso | ............ | G01C 21/36 701/423 |
| 2015/0243172 A1* | 8/2015 | Eskilson | ............ | A61B 5/18 701/1 |
| 2016/0039426 A1* | 2/2016 | Ricci | ............ | H04W 48/04 701/1 |
| 2016/0129787 A1* | 5/2016 | Netzer | ............ | B60K 35/00 701/36 |

OTHER PUBLICATIONS

International Search Report and Written Opinion dated Aug. 26, 2014, in International Application No. PCT/SE2014/050642, 11 pages.

* cited by examiner

METHODS AND NETWORK NODES FOR NOTIFYING VEHICLE DRIVERS ABOUT THEIR DRIVING

CROSS REFERENCE TO RELATED APPLICATION(S)

This application is a 35 U.S.C. § 371 National Phase Entry Application from PCT/SE2014/050642, filed May 26, 2014, designating the United States, the disclosure of which is incorporated herein in its entirety by reference.

TECHNICAL FIELD

The technology disclosed herein relates generally to the field of vehicle information use within wireless networks, and in particular to methods and devices for notifying users about their driving.

BACKGROUND

Much time and effort is put in to increase traffic safety in different ways. Many vehicles are for instance equipped with various types of sensors and information gathering devices, such as blind spot monitors, parking sensors, vehicle speed sensors, wheel speed sensors and numerous other types of sensors, many of which are aimed at increasing traffic safety.

A safety issue in current traffic situation is the increasing number of drivers exhibiting an aggressive driving style. These drivers pose a safety risk for themselves as well as for other drivers and also for pedestrians and other road users. Also other types of driving styles may pose a safety risk for the driver at hand as well as people in their proximity. These drivers, having an undesired driving style, are often unaware of posing a safety risk to others, and in contrast often believe themselves to be safe drivers. It is difficult to prevent and combat such dangerous driving styles, since it in essence is a matter for traffic police.

SUMMARY

An object of the present teachings is to solve or at least alleviate at least one of the above mentioned problems.

The object is according to a first aspect achieved by a method performed in a network node for notifying a driver of a vehicle about his or her driving. The method comprises receiving vehicle related information from a communication device capable of receiving data from a data collector of the vehicle; processing the vehicle related information such as to establish a driving indicator of a driver of the vehicle in relation to one or more other drivers; and transmitting to the communication device data indicating the driving indicator of the driver of the vehicle in relation to other drivers.

An advantage brought about by the method is that a driver can be informed visually and/or audibly about his or her driving style in relation to other drivers in their proximity. This enables e.g. drivers to be more "synchronized" with the driving style of other users, wherein as a particular example highly stressed and aggressive drivers showing an erratic driving style can be provided with feedback on their driving. Such drivers may be alerted about their dangerous driving style, while other drivers may be informed that their driving style is a preferred one. The use of sensors that are already available in many vehicles enables the method to be adopted by all vehicle manufactures including low-end vehicles.

The object is according to a second aspect achieved by a network node for notifying a driver of a vehicle about his or her driving. The network node comprises a processor; and a memory storing instructions that, when executed by the processor, causes the network node to: receive vehicle related information from a communication device capable of receiving data from a data collector of the vehicle; process the vehicle related information such as to establish a driving indicator of a driver of the vehicle in relation to one or more other drivers; and transmit to the communication device data indicating the driving indicator of the driver of the vehicle in relation to other drivers.

The object is according to a third aspect achieved by a computer program for a network node for notifying a driver of a vehicle about his or her driving. The computer program comprises computer program code, which, when run on the network causes the network node to: receive vehicle related information from a communication device capable of receiving data from a data collector of the vehicle, process the vehicle related information such as to establish a driving indicator of a driver of the vehicle in relation to one or more other drivers, and transmit to the communication device data indicating the driving indicator of the driver of the vehicle in relation to other drivers.

The object is according to a fourth aspect achieved by a computer program product comprising a computer program as above, and a computer readable means on which the computer program is stored.

The object is according to a fifth aspect achieved by a network node comprising first means for receiving vehicle related information from a communication device capable of receiving data from a data collector of the vehicle. The network node comprises second means for processing the vehicle related information such as to establish a driving indicator of a driver of the vehicle in relation to one or more other drivers. The network node comprises third means for transmitting to the communication device data indicating the driving indicator of the driver of the vehicle in relation to other drivers.

The object is according to a sixth aspect achieved by a method performed in a communication device for notifying a driver of a vehicle about his or her driving. The method comprise receiving, from a data collector of the vehicle, vehicle related information; sending the vehicle related information to a network node; and receiving from the network node data indicating a driving indicator of the driver of the vehicle in relation to other drivers.

The object is according to a seventh aspect achieved by a communication device for notifying a driver of a vehicle about his or her driving. The communication device comprises a processor and a memory storing instructions that, when executed by the processor, causes the communication device to: receive, from a data collector of the vehicle, vehicle related information; send the vehicle related information to a network node; and receive from the network node data indicating a driving indicator of the driver of the vehicle in relation to other drivers.

The object is according to an eighth aspect achieved by a computer program for a communication device for notifying a driver of a vehicle about his or her driving, the computer program comprising computer program code, which, when run on the communication device causes communication device to: receive vehicle related information from a communication device capable of receiving data from a data collector of the vehicle; process the vehicle related information such as to establish a driving indicator of a driver of the vehicle in relation to one or more other drivers; and transmit to the communication device data indicating the driving indicator of the driver of the vehicle in relation to other drivers.

The object is according to a ninth aspect achieved by a computer program product comprising a computer program as above, and a computer readable means on which the computer program is stored.

The object is according to a tenth aspect achieved by a communication device comprising means for receiving, from a data collector of the vehicle, vehicle related information; means for sending the vehicle related information to a network node; and means for receiving from the network node data indicating a driving indicator of the driver of the vehicle in relation to other drivers.

The object is according to an eleventh aspect achieved by a method performed in a first communication device for notifying a driver of a first vehicle about his or her driving. The method comprises: receiving, from a data collector of the vehicle, vehicle related information; establishing, based on the vehicle related information, a driving indicator of the driver of the first vehicle; sending, to a second communication device of a second vehicle, a request for a corresponding driving indicator of a driver of the second vehicle; receiving the requested driving indicator; and processing the driving indicator of the driver of the first vehicle and the driving indicator of the driver of the second vehicle, such as to obtain data indicating the driving indicator of the driver of the first vehicle in relation at least to the driver of the second vehicle.

Further features and advantages of the present disclosure will become clear upon reading the following description and the accompanying drawings.

DETAILED DESCRIPTION

Figure 1:
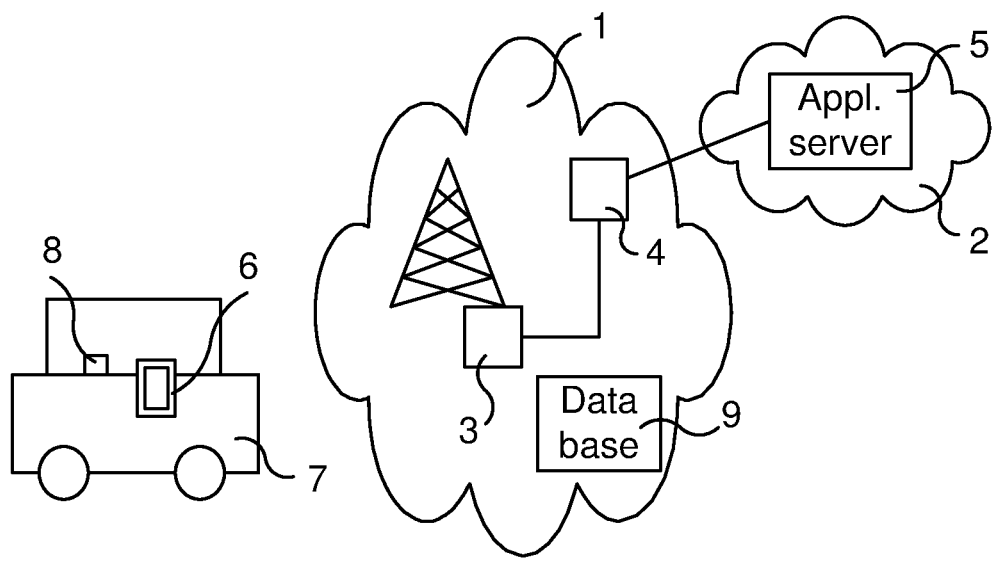
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, in an aspect of the present disclosure, advantage is taken of the usage of already existing sensors in vehicles in order to detect if a driver's stress level is high. A frequently fluctuating speed of a car may be taken as a possible indicator that the driver of the car is in a hurry, from which increased stress levels may be inferred. This impairs the driver's decision-making process, resulting in varying degrees of being a safety hazard to themselves and/or others. Additional car sensors may be accessed for instance through the car's On-Board-Diagnostics (OBD) interface. In an aspect of the present disclosure, such information is collected from all various sensors in each vehicle, which information is collected locally or centrally, whereupon the stress level of each driver is derived, or more generally indications about their mood. In another aspect, the information and stress levels may be maintained in a database providing an overview of the different stress levels of drivers on e.g. highways. Such information may be used to generate maps and to propose routes that are less stressful. Moreover, the information may be used in order to provide an on-the-fly ranking of a driver in relation to other drivers around him or her, taking into consideration contextual parameters, such as for example a specific highway, or a specific part of a city or a country, information about road works (e.g. on-going or coming), parades, demonstrations, drivers in the same sex and/or age group, similar road conditions (snow, oil spills, rain etc.), music played on the radio, drivers driving the same kind of vehicle, if the driver is utilizing actively the phone while driving etc.

FIG. 1 illustrates schematically an environment in which embodiments of the present disclosure may be implemented, and in particular a wireless communication network 1. The wireless communication network 1 may comprise a radio access network and a core network comprising various network nodes. The radio access network provides wireless communication over radio frequencies for various communication devices 6 (only one illustrated in the figure).

The radio access network comprises radio access nodes 3 (only one illustrated), each controlling one or more geographical areas (also denoted cells) and providing wireless communication for the communication devices 6 residing within a coverage corresponding to the geographical area(s). Such radio access nodes 3 may be denoted in various ways, e.g. base stations, eNB (in case of Long Term Evolution, LTE) etc.

The core network comprises network nodes, in the illustrated case a first core network node 4, comprising for example gateways, mobility management nodes etc. It is noted that the vocabulary for a particular network node, configured to do a certain set of functions, may differ depending on the particular wireless communication network 1 at hand and technology used therein. The wireless communication network 1 may comprise an application server (not illustrated) comprising applications receiving data from the communication devices 6, and sending messages to them.

The wireless communication network 1 may also be connected to an external packet data network 2, which may also comprise such application servers 5. Such application servicer 5 of the external packet data network 2, e.g. Internet, may communicate with the communication devices 6 over the wireless communication network 1.

The wireless communication network 1 may comprise still other types of nodes and servers and further for instance databases 9.

The communication devices 6 may comprise machine type communication devices, MTC devices (also denoted Machine to machine communication device, M2M devices), and communication devices used by users (also denoted user equipment, UE). A machine type device can be distinguished from a "normal" UE in that the former can, without human intervention, communicate with another wireless device, which can be a machine type device or a normal UE. The wireless communication may comprise of exchange of data, signaling, measurement data, configuration information etc.

Many vehicles 7 of today, e.g. cars and lorries, comprise numerous sensors for sensing different vehicle related parameters, and may thus generate data about the vehicle. The vehicle 7 may for instance comprise sensors for detecting current speed, speed fluctuations (acceleration and deceleration), detect braking action of the driver, rain sensors, steering wheel motions, road ice sensors etc. in order to generate information about the driver's mood (stress-level). Although additional sensors may be provided besides those already present on a typical car, the present disclosure provides methods for which existing sensors are sufficient, whereby the methods may be adopted by all vehicle manufactures including low-end vehicles. Moreover, in an aspect, when comparing different drivers, those who share the same cell tower may be found first, and then this selection may be narrowed down to those drivers who are travelling in the same direction.

The vehicle 7 may thus comprise a data collector 8, receiving and/or retrieving information from the various sensors. The data collector 8 may comprise an interface for communication with the communication device 6. Examples of such interface comprise Bluetooth, or other short-range technologies, whereby the communication device 6 can obtain (e.g. receive) sensor data related to the vehicle from the data collector 8.

The information collected in the vehicle 7 may be communicated by means of the communication device 6 to the wireless communication network 1, where the information may be recorded, e.g. stored in the database 9 or in a network node 3, 4. As mentioned, different types of information may be collected from the vehicle 7, and in various embodiments the vehicle's speed, location, fuel consumption and proximity to another vehicle are obtained. This information can be collected using the data collector 8, which receive or retrieve data from sensors, which may for example comprise On Board Detection sensors (OBD2). Such sensors are already available in the market and can be paired with communication devices 6, such as mobile devices, using Bluetooth pairing. A piece of software running on the communication device 6 can receive, interpret the information transmitted by the sensors, e.g. OBD2 sensor, and transmit them to the wireless communication network 1 or to local processing devices that may be available in the network nodes, in particular radio access nodes 3 in the vicinity.

The information collected by the vehicle 7 can be stored in a database 9 hosted somewhere in the wireless communication network 1, e.g. in the radio access node 3. The database 9 can be any conventional database or be an extended version of a home Subscriber Server/Home Location Register (HSS/HLR) node. In a tabular form the collected information may appear according to:

| Time-Stamp | ID | Speed | Location | Fuel | Proximity | Speed Limit | Weather Condition |
|---|---|---|---|---|---|---|---|
| 1 | 0 | 90 | (lat, lng) |  | 8 m | 90 | rain |
| 2 | 0 | 94 | (lat, lng) |  | 7 m | 90 | rain |
| 3 | 0 | 98 | (lat, lng) |  | 5 m | 90 | rain |

Complementary information e.g. related to the speed limit of the road on which the vehicle 7 is located or weather conditions can be collected by querying additional sources of information such as weather services and traffic maps via e.g.

Representational State Transfer (REST) based application programming interfaces (APIs).

Figure 2:
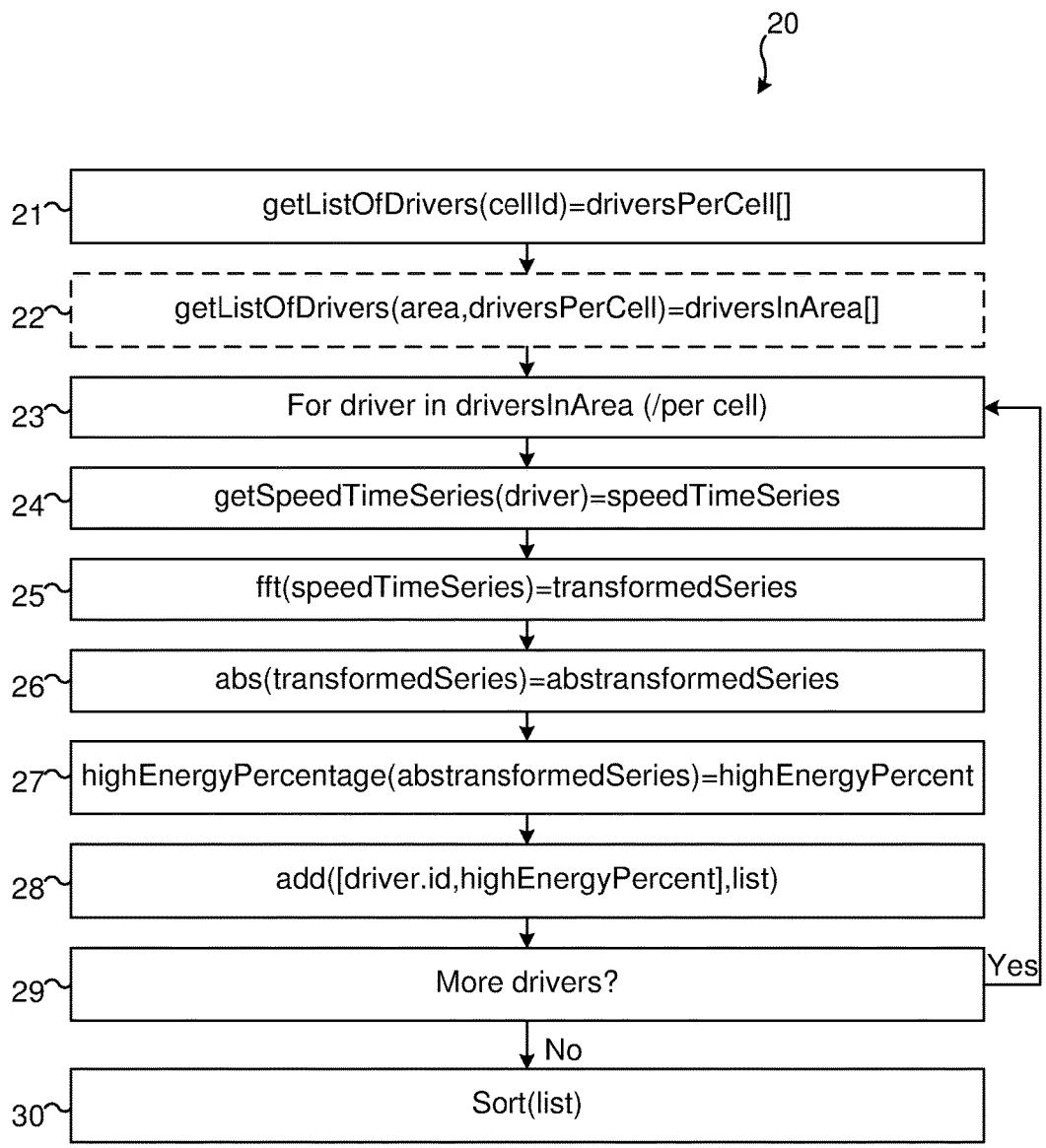
FIG. 2 illustrates a flow chart over steps of a method in accordance with the present disclosure.

FIG. 2 illustrates a flow chart over steps of an algorithm in accordance with an aspect of the present disclosure. The algorithm 20 may be used in order to determine the collective mood of the drivers in a certain area.

At step 21, drivers that are connected to and communicating with the same radio access node 3 are identified in order to identify possible candidates that should be compared in order to generate an overall mood (e.g. stress level) on a particular road.

At step 22, the list of drivers connected to a radio access node 3 may then be further refined to contain the drivers in a particular area, driving in the same direction. It is noted that this is an optional step, as indicated by dashed lines, and the algorithm 20 could be iterated over drivers in the cell.

Next, at step 23, the algorithm 20 iterates over the list of drivers in order to get the mood (e.g. stress level) of each individual driver. Thus, steps 24-28 are performed for each driver on the list.

At step 24, speed time series are obtained for a first driver in the cell or in the area. Such speed time series may have been obtained from the communication device 6, which in turn communicates with the data collector 8 of the vehicle 7 as has been described earlier. The speed values of the time series may have been recorded regularly, e.g. every 10 seconds, each minute, every five minutes etc. Alternatively, the speed time series may be triggered by a triggering event, such as a certain number of speed fluctuations within a (short) time period. The data collector 8 or a network node in which the algorithm 20 is effectuated may be configured accordingly.

At step 25, in order estimate the amount of fluctuations in speed each driver has, for instance a Fast Fourier Transformation (FFT) is used. The more fluctuations in the speed the more energy and therefore high peaks in higher frequencies of the FFT output (described more in detail later). A transformed speed time series is then obtained for the driver, comprising energy values.

At step 26, since the absolute values of the FFT transformation are of interest, an additional function is used to perform that. In particular, the absolute values of the transformed speed time series are obtained, giving an absolute value speed time series for the driver.

At step 27, the absolute values are used in order to determine how many of these values are "high", e.g. higher than a set threshold value. The amount of fluctuations is computed by an highEnergyPercentage function and the result is stored in an array. For example, if a driver has 5 values deemed to be high (high energy value) out of totally 10 values, then this driver gets a percentage of 50%. Using this transformation higher speed fluctuations indicate a higher level of stress (compare also FIGS. 3 and 4 and related description).

At step 28, the result for the driver is added to a list, which may comprise e.g. an identification of the driver, e.g. the International Mobile Equipment Identity (IMEI) or the like of the communication device 6 communicating the vehicle related data. The list further comprises the high-energy percentage (as determined in step 27) for the driver.

Next, at step 29, it is checked if a high energy percentage has been determined for all drivers identified at steps 21 or 22. If there are more drivers, flow reverts to step 23, and steps 23-28 are repeated for the next driver. If there are no more drivers on the list of drivers, flow continues to step 30, wherein the list comprising the drivers as identified have at least a corresponding high energy percentage associated with them.

When the algorithm 20 has been iterated for the entire list of drivers the results are sorted and the driver receives a ranking compared to others. This information may then be provided to the drivers, as will be described later with reference to FIGS. 5A, 5B and 5C.

In the following a more detailed description of steps of the algorithm 20 and in particular the FFT is given, with reference to FIGS. 3 and 4, which illustrate result of processing steps of the method of FIG. 2.

Considering the following time series that describes the different recorded speed values of a driver at consecutive points in time:
[90, 82, 91, 79, 89, 84, 95, 77, 91, 88, 92, 72, 69, 82, 90, 90, 82, 91, 79, 89, 84, 95, 77, 91, 88, 92, 72, 69, 82, 90]

This time series would constitute an example of an agitated driver due to the high amount of fluctuations in the speed. In an aspect an FFT transformation is employed to quantify the amount of fluctuations.

Typically an FFT is defined by the following equation for the computation of the Discrete Fourier Transform (DTF):

$$X_k = \sum_{n=0}^{N-1} x_n e^{-i2\pi k \frac{n}{N}} \quad k = 0, \ldots, N-1.$$

The above particular equation is notoriously computationally expensive and therefore there are several algorithms/techniques that provide efficient means of performing this computation.

Figure 3:
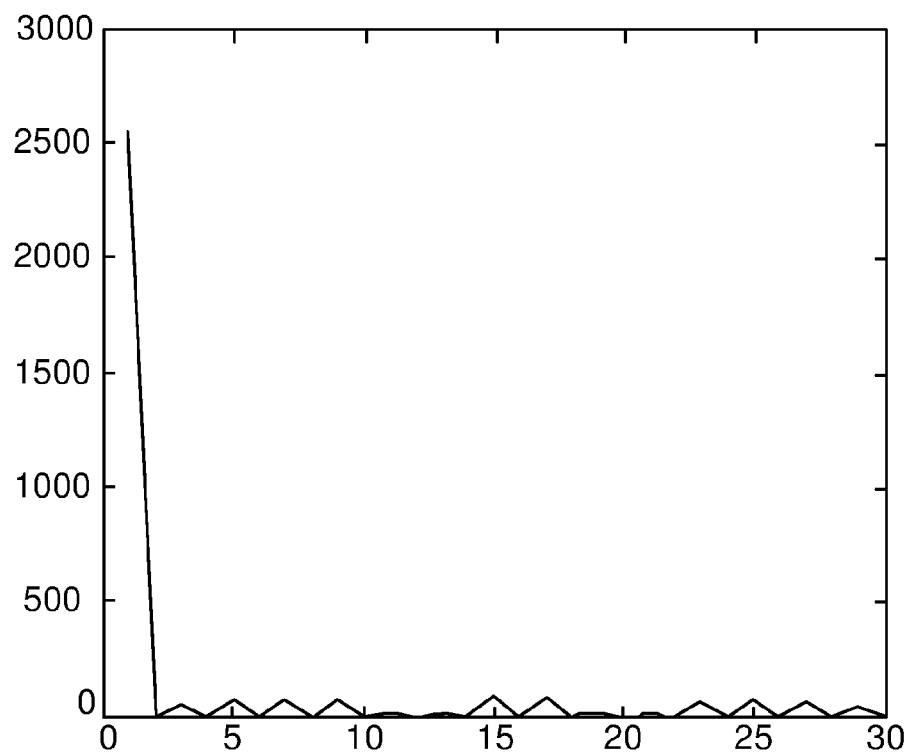
FIGS. 3 and 4 illustrate result of a processing step of the method of FIG. 2.

By performing an fft transformation in the above exemplary time series and then using the absolute values of the result the results shown in FIG. 3 are obtained. In the premises of the present disclosure an interesting observation is the chainsaw like pattern that appears in the plot. Namely, the higher amount of spikes that appears high, the more aggressively a driver is driving. In this case 7 spikes can be identified in the chainsaw pattern. A spike may be a value that is higher than a particular threshold (compare step 27 of FIG. 2); in the particular example of FIG. 3 the threshold is the number 50. The threshold may be selected in an ad-hoc fashion but also more sophisticated means can be used to define this threshold. A goal of the highEnergyPercentage function is to find the amount of spikes.

Now another example of a time series is considered that does not contain that many fluctuations:
[90, 89, 90, 88, 90, 87, 92, 88, 91, 88, 89, 92, 91, 92, 90, 90, 89, 90, 88, 90, 87, 92, 88, 91, 88, 89, 92, 91, 92, 90]

Figure 4:
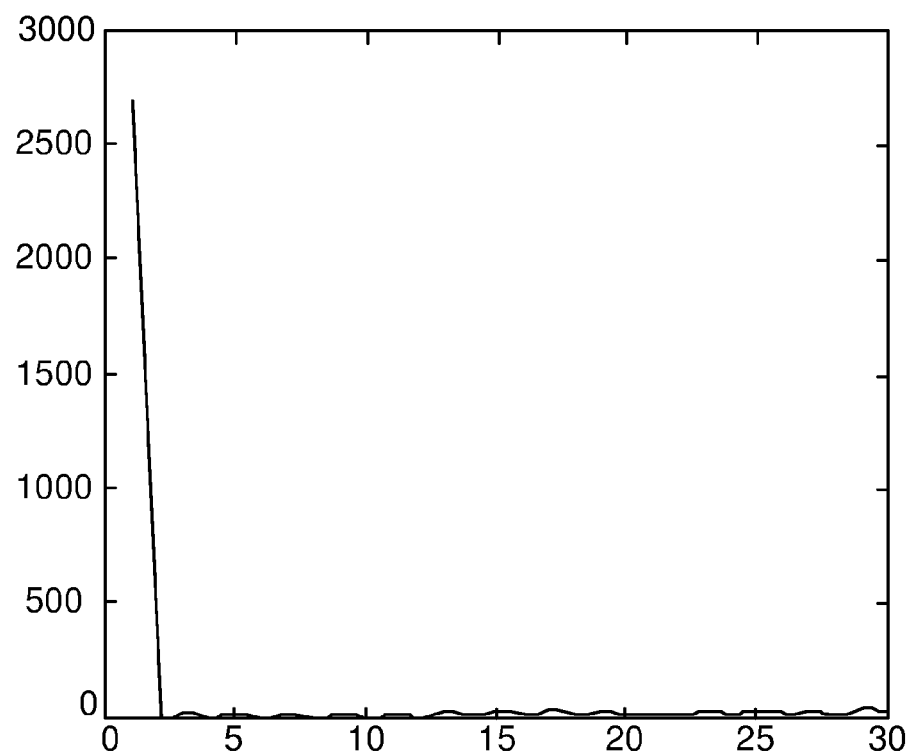

The result of the same FFT transformation (absolute value, same amount of points) is shown in the FIG. 4. As can be seen in the FIG. 4, in this case, i.e. for this time series, the chainsaw pattern is barely visible, thus the amount of speed fluctuations is very low.

The algorithm 20 can be triggered on demand, or periodically in order to recalculate the mood of the driver as the vehicle is moving. The algorithm 20 may be used for providing an indication e.g. on an application showing how the current driver compares "mood-wise" to the other drivers around him. This means that driving behavior is interpreted in a dynamic way, where an appropriate driving style is determined by context and not statically.

Figures 5A, 5B, 5C:
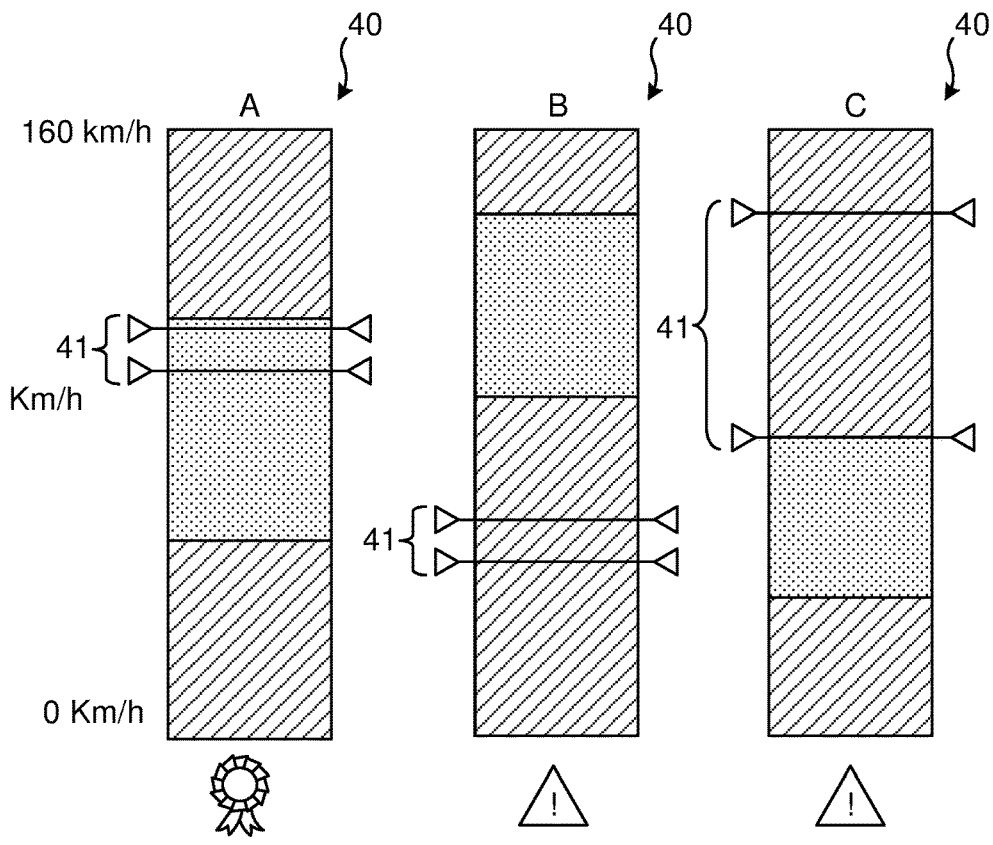
FIGS. 5A, 5B and 5C illustrate exemplary visualizations of relative stress level of a driver.

FIGS. 5A, 5B and 5C illustrate exemplary visualizations of relative stress level of a driver. The ranking of the drivers obtained by means of the algorithm 20 described in relation to FIG. 2, may be visualized in different ways, examples of which are shown in FIGS. 5A, 5B and 5C. Using such visualization, the driver can get direct feedback about his stress level in relation to the stress level of the other drivers around him.

The sliding scale 40 of FIGS. 5A, 5B and 5C, for speed between 0 km/h to 160 km/h, illustrates a desired range, indicated by the dotted area, within which the driving indicator 41 for the driver is recommended to fall. The dotted area reflects how most of the drivers within the area drive, and in most cases this is the preferred driving style since most drivers e.g. keep within speed limits and adapt their speed to surrounding conditions such as rainy weather etc. The driving indicator 41 may e.g. be the ranking of stress level compared to other drivers received as feedback from the wireless communication network 1 (e.g. the radio access node 3). The hatched area indicates "danger zones", i.e. wherein the driving indicator 41 of the driver indicates a dangerous driving style. In the FIGS. 5A, 5B, 5C the driving indicator 41 indicates a range of speed of the driver, where erratic driving (i.e. large variations in speed) will be indicated by lines that span a wide section, thus indicating appropriate speed as well as smoothness of driving.

For instance, a driver B (FIG. 5B) driving at 80 km/h, well within the speed limit of 110 km/h on a specific road, believing himself to be driving safely, might in fact be posing a risk to himself as well as other drivers as his driving is out of synch with the others driving at 110 km/h. Such information may then be fed back to the driver B who has the opportunity to alter his driving style to a safer one. The information may thus be illustrated as the driving indicator 41 indicating driver B's driving style e.g. in terms of speed or stress level in relation to the other drivers. The driving style of driver C is smooth (as opposed to erratic) and is thus illustrated by the driving indicator 41 spanning a small section, the driving style still being undesired (by being out of sync with the other drivers), the driving indicator 41 hence falling outside the desired range (i.e. dotted area).

Conversely the same holds true for the more typical scenario where a driver C (FIG. 5C) with an erratic driving style, indicating higher stress levels. Information conveying this may be fed back the level of appropriateness of his or her driving style.

Finally, a driver A (FIG. 5A) who drives at an appropriate speed without sudden changes of speed will be fed back on the sliding indicator that they are within the dotted area i.e. have the desired driving style.

It is noted that the sliding scale 40 could be visualized by colors, e.g. the desired behavior (e.g. keeping a certain speed) indicated by the driving indicator 41 could be visualized by a green color, while the undesired behavior (e.g. driving too fast or too slow) is visualized by a red color. Further, there may be shades there between, wherein the sliding scale 40 gradually changes color. Referring to the FIGS. 5A, 5B, 5C, the dotted area could e.g. be green and the hatched areas red.

The method may be implemented and performed in different nodes. The choice of where in the wireless communication network to perform e.g. the calculations of stress level may for instance be based on the speed limit of certain road segments. In highways where most vehicles move with a high speed the calculations of the stress level may be performed in the core network part of the wireless communication network 1 or even in the radio access node 3 if there is an appropriate execution environment for application level processes. An appropriate execution environment may be one that has the sufficient resources, e.g. in terms of computational, communication, storage etc., that allows the execution of the computation of the stress level. The appropriate execution environment should also be open for an owner of the stress level applications to deploy the application in it. One example of such execution environment comprises having a powerful device onboard each vehicle doing this computation (e.g. a smartphone or the like). Another example comprises having the same kind of computational device coupled together with, or constituting a part of a network node, e.g. a base station (BS).

The calculation results may be stored e.g. in the wireless communication network and be provided, at a later stage, for dissemination to non-paying drivers (assuming such service of calculating the road stress level is charged the drivers). In the countryside where the speed limits are low the calculations may be performed higher up in the wireless communication network or elsewhere, e.g. in external data networks, without much impact on the dissemination delay to the paying or non-paying customers.

The speed fluctuations may also (instead of using a vehicle speed sensor) be measured by the driver's communication device (e.g. mobile phone) accelerometer sensor assuming that the communication device is fixed during the trip. This assumption does not hold for example if a person (driver or family member) moves the communication device while driving.

On-board proximity sensors on a specific vehicle may also measure the behavior of other drivers if the current driver is deemed by the described algorithm as non-stressed. If the proximity sensor of a vehicle (whose driver is calm) detects vehicles in the vicinity the distance to which has large fluctuations, this means that the vehicles behind or in the front is driven by a stressed driver. The network node that reports the stress level of the current driver could report about other stressed drivers as well. In order to avoid a double counting only one of the proximity sensor sets (front or back) could be used but not both.

In order to preserve the privacy of the drivers, the collected data may be anonymized.

In an embodiment, feedback may be provided to a stressed driver about her/his driving behavior by playing back a message that mentions how much time the driver will gain by the specific driving behavior, e.g. a message like " . . . you are gaining 2 seconds with this driving . . . ". This action could be taken when the driver crosses into the "danger zone" (compare hatched area of FIGS. 5A, 5B, 5C) on the driver style slider (compare sliding scale 40 of FIGS. 5A, 5B, 5C and related text). Additionally the message could be played back using one or more family member voice characteristics in order to make the driver conscious of their driving behavior. Often times the driver gets tired and stops listening if the voice come from a third person (e.g. voice that recommends GPS directions), and therefore the use of pre-recorded messages using a family member voice will have an increased effect in alerting the driver of his/her driving behavior.

Figure 6:
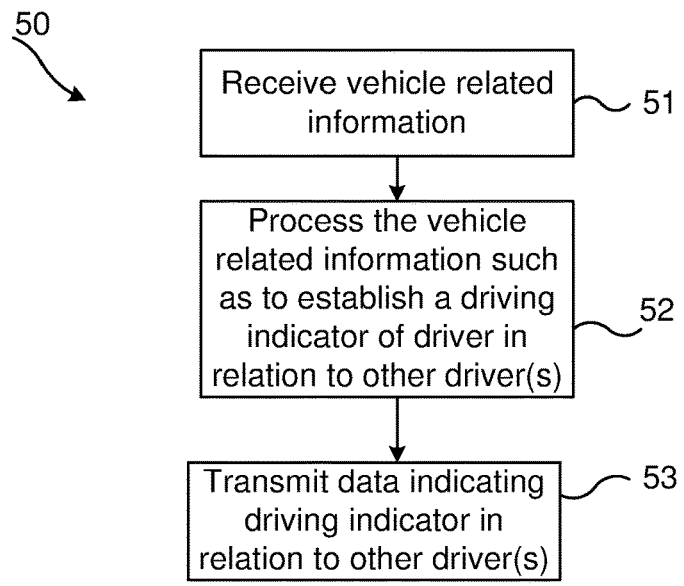
FIG. 6 illustrates a flow chart over steps of a method in a network node in accordance with the present disclosure.

The various features that have been described can be combined in different ways, examples of which are described in the following with reference first to FIG. 6. FIG. 6 illustrates a flow chart over steps of a method 50 in a network node in accordance with the present disclosure. The method 50 for notifying a driver of a vehicle 7 about his or her driving may be performed in a network node 3, 4, 5, such as for instance a radio access node 3, a core network node 4, or any other node of the wireless communication network 1. The method 50 may also be performed in an external network 2, e.g. an application server 5, which communicates with the communication devices 6 over the wireless communication network 1.

The method 50 comprises receiving 51 vehicle related information from a communication device 6 capable of receiving data from a data collector 8 of the vehicle 7. For example, the communication device 6 may receive data from the data collector 8, which in turn receives (or retrieves) such information from various sensors of the vehicle 7. Examples of such data comprise speed of vehicle, braking action of vehicle etc.

The method 50 comprises processing 52 the vehicle related information such as to establish a driving indicator of a driver of the vehicle 7 in relation to one or more other drivers. A ranking of the drivers e.g. in a certain area may be obtained by using algorithm 20 described with reference to FIG. 2. The driving indicator may for example be a stress level of the driver.

The method 50 comprises transmitting 53 to the communication device 6 data indicating the driving indicator of the driver of the vehicle 7 in relation to other drivers. The driving indicator may for example be visualized for the driver in a scale showing whether his driving indicator lies within a desired range.

In an embodiment, the receiving 51 further comprises receiving complementary information and wherein the processing 52 comprises processing also the complementary information in the establishing of the driving indicator of the driver of the vehicle 7 in relation to other drivers.

In various embodiments, the complementary information comprises one or more of: speed limit of road, weather conditions, current road utilization (stating whether the road full or empty, or degree of occupancy), road condition, road age, a specific highway, or a specific part of a city or a country, information about road works, parades, demonstrations, drivers in the same sex and/or age group, similar road conditions such as snow, oil spills, rain.

In various embodiments, the vehicle related information comprises one or more of: speed of vehicle, location of vehicle, fuel consumption of vehicle, proximity of vehicle to other vehicles, music played on a radio of the vehicle, communication device use (defining if the driver is actively utilizing a phone while driving or another communication device onboard the vehicle).

In an embodiment, the vehicle related information comprises at least the speed of the vehicle 7 and the processing 52 comprises:
  calculating number of fluctuations of the speed of the vehicle 7, wherein a fluctuation is a speed variation larger than a threshold value, and
  ranking the driving indicator of the driver in relation to a driving indicator of one or more other drivers based on the number of fluctuations of speed of the vehicle 7. A high number of fluctuations typically correspond to a high stress level (also compare description in relation to FIG. 3).

In an embodiment, the processing 52 comprises:
  calculating a driving indicator of the driver of the vehicle 7 based on the vehicle related information,
  comparing the established driving indicator to driving indicators of one or more other drivers, and
  establishing the driving indicator of the driver of the vehicle 7 in relation to one or more other drivers.

In a variation of the above embodiment, the comparing comprises comparing the established driving indicator to driving indicators established for one or more drivers of a respective vehicle located within a first distance of the vehicle 7.

In an embodiment, the method 50 comprises repeating the receiving 51 and processing 52 for a number of communication devices, and storing the data of driving indicators of drivers of vehicles 7 in a database 9.

In a variation of the above embodiment, the method 50 comprises transmitting, to the communication device 6, routing information generated based on the stored data, and wherein the routing information comprises suggested routes based on an aggregated stress level of drivers on the respective routes.

In an embodiment, the driving indicator comprises an estimated stress level of the driver.

Figure 7:
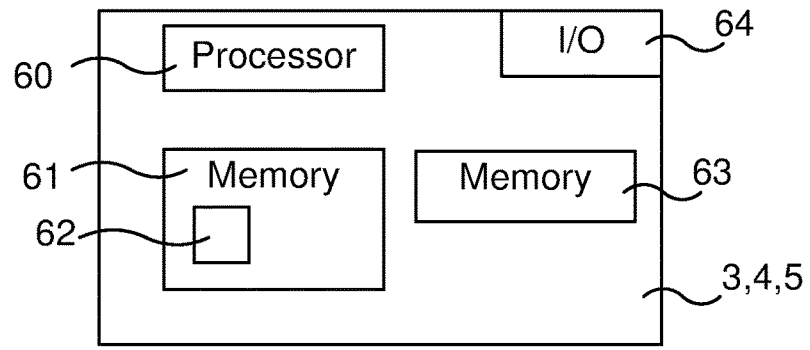
FIG. 7 illustrates schematically a network node and means for implementing methods of the present disclosure.

FIG. 7 illustrates schematically a network node and means for implementing methods of the present disclosure.

The network node 3, 4, 5 may comprise a node of the radio access network or a node of the core network, described in relation to FIG. 1. Depending on in which network node 3, 4, 5 the method is implemented the network node may comprise different components, devices and circuitry.

The network node 3, 4, 5, irrespective of type of node, comprises one or more input/output devices 64 for communicating with other network nodes of the wireless communication network 1. Such input/output device(s) 64 may comprise interfaces such as e.g. in case of LTE, X2 interface for communication between radio access nodes (eNBs) and/or S1 interface for communication between a radio access node and a core network node such as mobility management entity/serving gateway (MME-SG).

The network node 3, 4, 5 may further comprise devices and circuitry for receiving/transmitting (Rx/Tx) radio frequency signals, e.g. antennas and related components.

The network node 3, 4, 5 comprises a processor 60 comprising any combination of one or more of a central processing unit (CPU), multiprocessor, microcontroller, digital signal processor (DSP), application specific integrated circuit etc. capable of executing software instructions stored in a memory 61, which can thus be a computer program product 61. The processor 60 can be configured to execute any of the various embodiments of the method as described for instance in relation to FIG. 6.

In particular, a network node 3, 4, 5 is provided for notifying a driver of a vehicle 7 about his or her driving. The network node 3, 4, 5 comprises a processor 60 and a memory 61 storing instructions that, when executed by the processor 60, causes the network node 3, 4, 5 to:
  receive vehicle related information from a communication device 6 capable of receiving data from a data collector 8 of the vehicle 7,
  process the vehicle related information such as to establish a driving indicator of a driver of the vehicle 7 in relation to one or more other drivers, and
  transmit to the communication device 6 data indicating the driving indicator of the driver of the vehicle 7 in relation to other drivers.

In an embodiment, the network node 3, 4, 5 operative to receive by further receiving complementary information and operative to process by processing also the complementary information in the establishing of the driving indicator of the driver of the vehicle 7 in relation to other drivers.

In a variation of the above embodiment, the complementary information comprises one or more of: speed limit of road, weather conditions, current road utilization (stating whether the road full or empty, or degree of occupancy), road condition, road age, a specific highway, or a specific part of a city or a country, information about road works, parades, demonstrations, drivers in the same sex and/or age group, similar road conditions such as snow, oil spills, rain.

In an embodiment, the vehicle related information comprises one or more of: speed of vehicle, location of vehicle, fuel consumption of vehicle, proximity of vehicle to other vehicles, music played on a radio of the vehicle, communication device use (defining if the driver is actively utilizing a phone while driving or another communication device onboard the vehicle).

In an embodiment, the vehicle related information comprises at least the speed of the vehicle 7 and the network node 3, 4, 5 is operative to process by:
  calculating number of fluctuations of the speed of the vehicle 7, wherein a fluctuation is a speed variation larger than a threshold value, and
  ranking the driving indicator of the driver in relation to a driving indicator of one or more other drivers based on the number of fluctuations of speed of the vehicle 7.

In an embodiment the network node 3, 4, 5 is operative to process by:
  calculating a driving indicator of the driver of the vehicle 7 based on the vehicle related information,
  comparing the established driving indicator to driving indicators of one or more other drivers, and
  establishing the driving indicator of the driver of the vehicle 7 in relation to one or more other drivers.

In a variation of the above embodiment, the network node 3, 4, 5 is operative to compare by comparing the established driving indicator to driving indicators established for one or more drivers of a respective vehicle located within a first distance of the vehicle 7.

In an embodiment, the network node 3, 4, 5 is operative to repeat the receiving and processing for a number of communication devices, and store the data of driving indicators of drivers of vehicles 7 in a database 9.

In a variation of the above embodiment, the network node 3, 4, 5 is operative to transmit, to the communication device 6, routing information generated based on the stored data, wherein the routing information comprises suggested routes based on an aggregated stress level of drivers on the respective routes.

In an embodiment, the driving indicator comprises an estimated stress level of the driver.

Still with reference to FIG. 7, the memory 61 can be any combination of read and write memory (RAM) and read only memory (ROM). The memory 61 also comprises persistent storage, which, for example, can be any single one or combination of magnetic memory, optical memory, solid state memory or even remotely mounted memory.

A data memory 63 may also be provided for reading and/or storing data during execution of software instructions in the processor 60. The data memory 63 can be any combination of read and write memory (RAM) and read only memory (ROM).

The present disclosure also encompasses a computer program product 61 comprising a computer program 62 for implementing the methods as have been described, and a computer readable means on which the computer program 62 is stored. The computer program product 61 may be any combination of read and write memory (RAM) or read only memory (ROM). The computer program product 61 may also comprise persistent storage, which for example can be any single one or combination of magnetic memory, optical memory or solid state memory.

The present disclosure thus encompasses also a computer program 62 for a network node 3, 4, 5 for notifying a driver of a vehicle 7 about his or her driving, the computer program 62 comprising computer program code, which, when run on the network node 3, 4, 5 causes the network node 3, 4, 5 to:
receive vehicle related information from a communication device 6 capable of receiving data from a data collector 8 of the vehicle 7,
process the vehicle related information such as to establish a driving indicator of a driver of the vehicle 7 in relation to one or more other drivers, and
transmit to the communication device 6 data indicating the driving indicator of the driver of the vehicle 7 in relation to other drivers.

The computer program product, or the memory, thus comprises instructions executable by the processor. Such instructions may be comprised in a computer program, or in one or more software modules or function modules.

Figure 8:
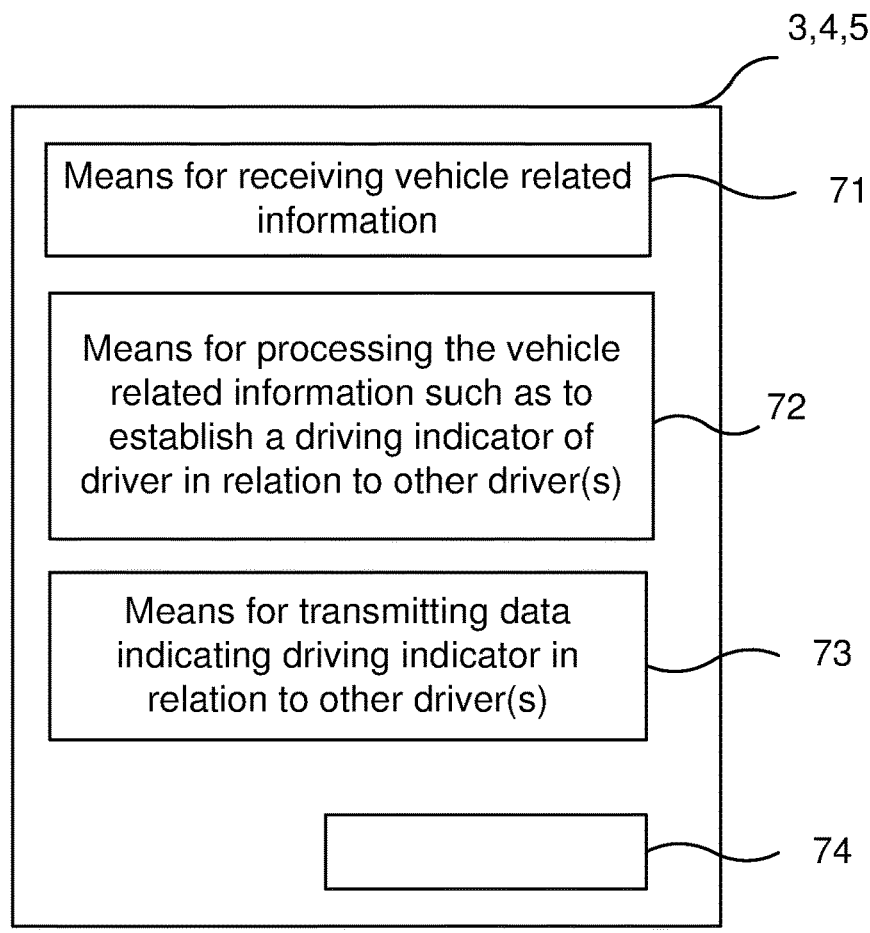
FIG. 8 illustrates a network node comprising function modules/software modules for implementing methods of the present disclosure.

An example of an implementation using functions modules/software modules is illustrated in FIG. 8, in particular illustrating network node 3, 4, 5 comprising means for implementing methods of the present disclosure. The network node 3, 4, 5 comprises first means, for example a first function module 71, for receiving vehicle related information from a communication device 6 capable of receiving data from a data collector 8 of the vehicle. The network node 3, 4, 5 comprises second means, for example a second function module 72, for processing the vehicle related information such as to establish a driving indicator of a driver of the vehicle 7 in relation to one or more other drivers. The network node 3, 4, 5 comprises third means, for example a third function module 73, for transmitting to the communication device 6 data indicating the driving indicator of the driver of the vehicle 7 in relation to other drivers.

The network node 3, 4, 5 may comprise still further such means for implementing and performing the various features and steps as has been described. Such further means is illustrated at reference numeral 74.

The function modules 71, 72, 73, 74 can be implemented using software instructions such as computer program executing in a processor and/or using hardware, such as application specific integrated circuits, field programmable gate arrays, discrete logical components etc.

Figure 9:
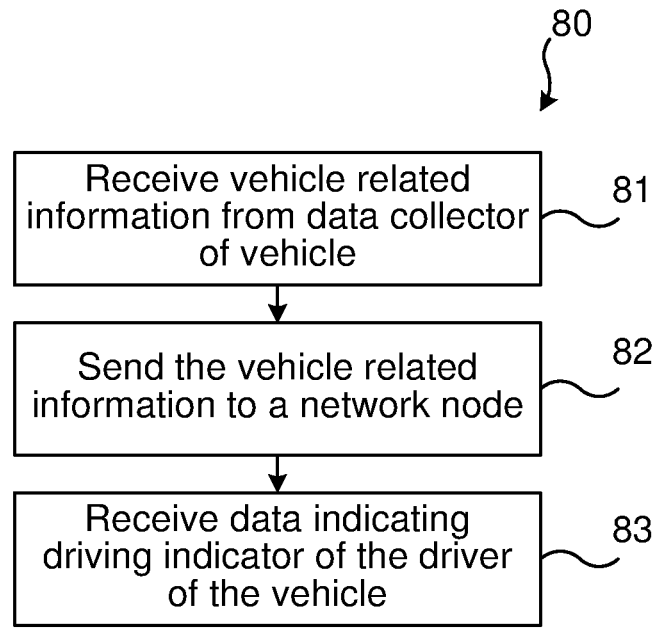
FIG. 9 illustrates a flow chart over steps of a method in a communication device in accordance with the present disclosure.

FIG. 9 illustrates a flow chart over steps of a method in a communication device in accordance with the present disclosure. The method 80 may thus be performed in a communication device 6 for notifying a driver of a vehicle 7 about his or her driving. The method 80 comprises receiving 81, from a data collector 8 of the vehicle 7, vehicle related information. As described earlier the data collector 8 may receive or retrieve sensor data from various sensors of the vehicle 7 and communicate the data to the communication device 6 e.g. using Bluetooth or any other short-range radio technology.

The method 80 comprises sending 82 the vehicle related information to a network node 3, 4, 5. In the network node 3, 4, 5 the information is processed in way that has been described.

The method 80 comprises receiving 83 from the network node 3, 4, 5 data indicating a driving indicator of the driver of the vehicle 7 in relation to other drivers.

In an embodiment, the method 80 comprises visualizing the received data indicating the driving indicator of the driver on a display 93 of the communication device 6. A sliding scale 40 such as illustrated in FIGS. 5A, 5B, 5C and described in relation thereto may for example be shown on the display 93.

In a variation of the above embodiment, the method 80 comprises playing a voice message providing the driver of the vehicle 7 with information about the driving.

Figure 10:
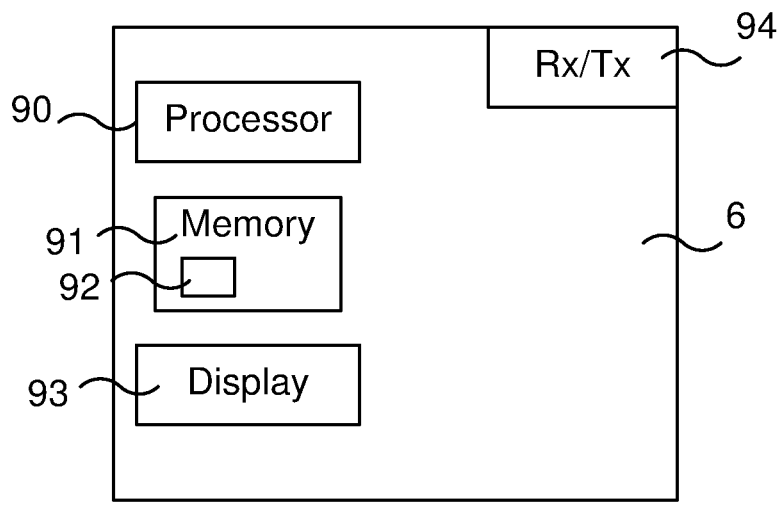
FIG. 10 illustrates schematically a communication device and means for implementing methods of the present disclosure.

FIG. 10 illustrates schematically a communication device 6 and means for implementing embodiment of the methods of the present disclosure.

The communication device 6 comprises one or more input/output device 94 for communicating with network nodes 3, 4, 5 of the wireless communication network 1. Such input/output device(s) 94 may comprise devices and circuitry for receiving/transmitting (Rx/Tx) radio frequency signals, e.g. antennas and related components. The communication device 6 may typically comprise another type of input device (not explicitly illustrated) for receiving user input, for example a keypad or the like.

The communication device 6 may further comprise a display device 93, for example a display device conventionally used in communication devices of cellular type. The display device 93 may be used for displaying the received data relating to the driving style (e.g. as illustrated in FIGS. 5A, 5B and 5C).

The communication device 6 may comprise still further components and circuitry conventionally used, a particular example of which is loudspeaker and related circuitry. Such loudspeaker may be used for playing back a pre-recorded message, e.g. "Daddy, you are driving too fast".

The communication device 6 comprises a processor 90 comprising any combination of one or more of a central processing unit (CPU), multiprocessor, microcontroller, digital signal processor (DSP), application specific integrated circuit etc. capable of executing software instructions stored in a memory 91, which can thus be a computer program product 91. The processor 90 can be configured to execute any of the various embodiments of the method as described for instance in relation to FIG. 9.

In particular, a communication device 6 for notifying a driver of a vehicle 7 about his or her driving is provided. The communication device 6 comprises a processor 90 and a memory 91 storing instructions that, when executed by the processor 90, causes the communication device 6 to:
receive, from a data collector 8 of the vehicle 7, vehicle related information,
send the vehicle related information to a network node 3, 4, 5, and
receive from the network node 3, 4, 5 data indicating a driving indicator of the driver of the vehicle 7 in relation to other drivers.

Still with reference to FIG. 10, the memory 91 can be any combination of read and write memory (RAM) and read only memory (ROM). The memory 91 also comprises persistent storage, which, for example, can be any single one or combination of magnetic memory, optical memory, solid state memory or even remotely mounted memory.

A data memory (not illustrated) may also be provided for reading and/or storing data during execution of software instructions in the processor 90. The data memory can be any combination of read and write memory (RAM) and read only memory (ROM).

The present disclosure also encompasses a computer program product 91 comprising a computer program 92 for implementing the methods as have been described, and a computer readable means on which the computer program 92 is stored. The computer program product 91 may be any combination of read and write memory (RAM) or read only memory (ROM). The computer program product 91 may also comprise persistent storage, which for example can be any single one or combination of magnetic memory, optical memory or solid state memory.

The present disclosure thus encompasses also a computer program 92 for a communication device 6 for notifying a driver of a vehicle 7 about his or her driving. The computer program 92 comprises computer program code, which, when run on the communication device 6 causes communication device 6 to:
- receive vehicle related information from a communication device 6 capable of receiving data from a data collector 8 of the vehicle 7,
- process the vehicle related information such as to establish a driving indicator of a driver of the vehicle 7 in relation to one or more other drivers, and
- transmit to the communication device 6 data indicating the driving indicator of the driver of the vehicle 7 in relation to other drivers.

The computer program product, or the memory, thus comprises instructions executable by the processor. Such instructions may be comprised in a computer program, or in one or more software modules or function modules.

Figure 11:
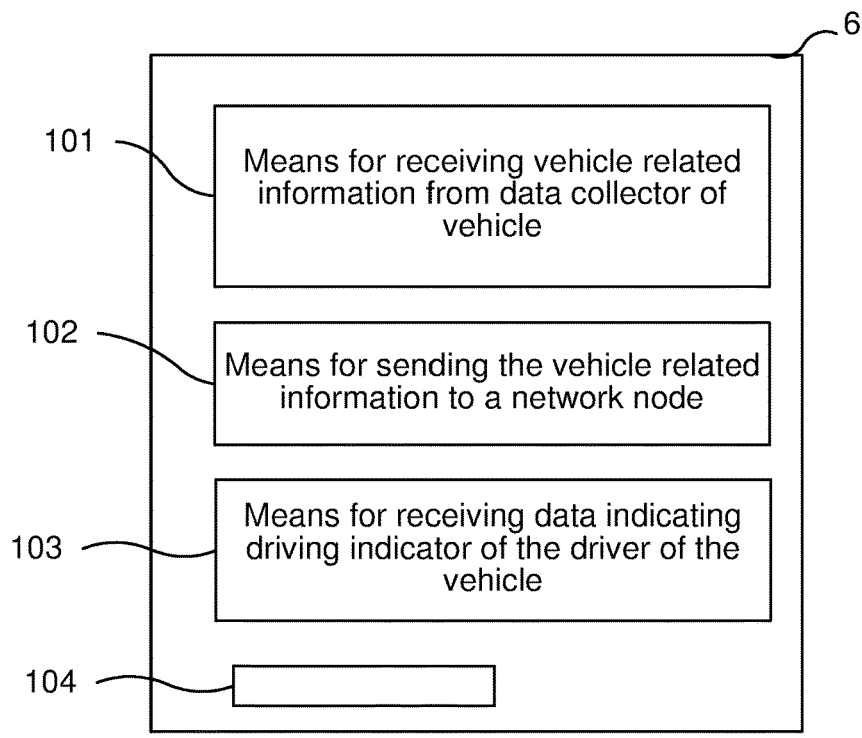
FIG. 11 illustrates a communication device comprising function modules/software modules for implementing methods of the present disclosure.

An example of an implementation using functions modules/software modules is illustrated in FIG. 11, in particular illustrating a communication device 6 comprising means for implementing embodiments of the methods of the present disclosure. The communication device 6 comprises first means 101, for example a first function module, for receiving, from a data collector 8 of the vehicle 7, vehicle related information. The communication device 6 comprises second means 102, for example a second function module, for sending the vehicle related information to a network node 3, 4, 5. The communication device 6 comprises third means 103, for example a third function module, for receiving from the network node 3, 4, 5 data indicating a driving indicator of the driver of the vehicle 7 in relation to other drivers.

The communication device 6 may comprise still further such means for implementing and performing the various features and steps as has been described. Such further means is illustrated at reference numeral 104.

The function modules 101, 102, 103, 104 can be implemented using software instructions such as computer program executing in a processor and/or using hardware, such as application specific integrated circuits, field programmable gate arrays, discrete logical components etc.

Figure 12:
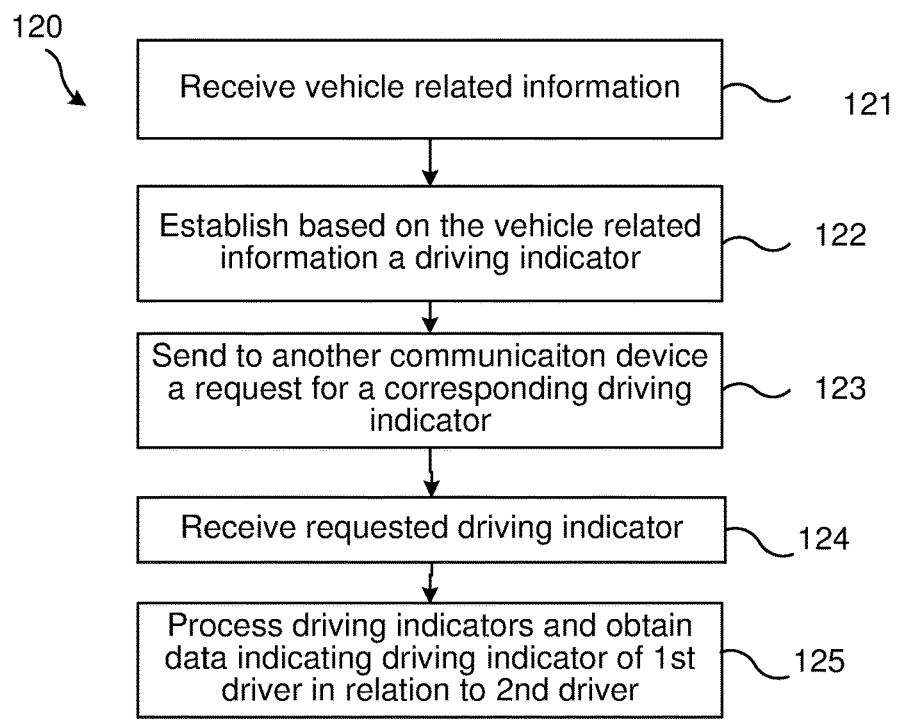
FIG. 12 illustrates a flow chart over steps of a method performed in a first communication device.

In still another aspect of the present disclosure, illustrated in FIG. 12, a method is provided which may be performed in a first communication device 6 for notifying a driver of a first vehicle 7 about his or her driving. The method comprises receiving 121, from a data collector 8 of the vehicle 7, vehicle related information.

The method comprises establishing 122, based on the vehicle related information, a driving indicator of the driver of the first vehicle 7.

The method comprises sending 123, to a second communication device 6 of a second vehicle, a request for a corresponding driving indicator of a driver of the second vehicle.

The method comprises receiving 124 the requested driving indicator.

The method comprises processing 125 the driving indicator of the driver of the first vehicle 7 and the driving indicator of the driver of the second vehicle, such as to obtain data indicating the driving indicator of the driver of the first vehicle 7 in relation at least to the driver of the second vehicle.

The algorithm described in relation to FIG. 2 may be used in a distributed manner, wherein each vehicle (e.g. a data collector thereof) calculates the driving indicator for the driver of this vehicle, and wherein the information is distributed among the drivers within a particular area. Such information distribution may for example be effectuated by machine-to-machine type of communication between the communication devices of the drivers.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node for notifying a driver of a vehicle about his or her driving, the method comprising:
   receiving vehicle related information from a communication device capable of receiving data from a data collector of the vehicle, wherein the data collector is configured to obtain the vehicle related information from one or more sensors on the vehicle;
   processing the vehicle related information to establish a driving indicator of a driver of the vehicle in relation to one or more other drivers, wherein processing the vehicle related information comprises calculating a driving indicator of the driver of the vehicle based on the vehicle related information and comparing the calculated driving indicator to driving indicators established for one or more drivers of a respective vehicle located within a first distance of the vehicle, and wherein the driving indicator comprises an estimated stress level of the driver; and
   transmitting to the communication device data indicating the driving indicator of the driver of the vehicle in relation to other drivers.

2. The method as claimed in claim 1, wherein the receiving further comprises receiving complementary information and wherein the processing comprises processing also the complementary information in the establishing of the driving indicator of the driver of the vehicle in relation to other drivers.

3. The method as claimed in claim 2, wherein the complementary information comprises one or more of: speed limit of road, weather conditions, current road utilization, road condition, road age, a specific highway, a specific part of a city or a country, information about road works, parades, demonstrations, drivers in the same sex and/or age group, and similar road conditions.

4. The method as claimed in claim 1, wherein the vehicle related information comprises one or more of: speed of vehicle, location of vehicle, fuel consumption of vehicle, proximity of vehicle to other vehicles, music played on a radio of the vehicle, and communication device use.

5. The method as claimed in claim 1, wherein the vehicle related information comprises at least the speed of the vehicle and wherein the processing comprises:
   calculating a number of fluctuations of the speed of the vehicle, wherein a fluctuation is a speed variation larger than a threshold value; and ranking the driving indicator of the driver in relation to a driving indicator of one or more other drivers based on the number of fluctuations of speed of the vehicle.

6. A computer program for a network node for notifying a driver of a vehicle about his or her driving, the computer program comprising computer program code, which, when run on the network node causes the network node to:
receive vehicle related information from a communication device capable of receiving data from a data collector of the vehicle, wherein the data collector is configured to obtain the vehicle related information from one or more sensors on the vehicle;
process the vehicle related information such as to establish a driving indicator of a driver of the vehicle in relation to one or more other drivers, wherein processing the vehicle related information comprises calculating a driving indicator of the driver of the vehicle based on the vehicle related information and comparing the calculated indicator to driving indicators established for one or more drivers of a respective vehicle located within a first distance of the vehicle, and wherein the driving indicator comprises an estimated stress level of the driver; and
transmit to the communication device data indicating the driving indicator of the driver of the vehicle in relation to other drivers.

7. A computer program product comprising a computer program as claimed in claim 6, and a non-transitory computer readable medium on which the computer program is stored.

8. The method as claimed in claim 1, comprising repeating the receiving and processing for a number of communication devices, and storing the data of driving indicators of drivers of vehicles in a database.

9. The method as claimed in claim 8, comprising transmitting, to the communication device, routing information generated based on the stored data, wherein the routing information comprises suggested routes based on an aggregated stress level of drivers on the respective routes.

10. A method performed in a communication device for notifying a driver of a vehicle about his or her driving, the method comprising:
receiving, from a data collector of the vehicle, vehicle related information;
sending the vehicle related information to a network node, wherein the network node is configured to process the vehicle related information to establish a driving indicator of a driver of the vehicle in relation to one or more other drivers, the processing comprising: (i) calculating a driving indicator of the driver of the vehicle based on the vehicle related information and (ii) comparing the calculated driving indicator to driving indicators established for one or more drivers of a respective vehicle located within a first distance of the vehicle; and
receiving from the network node data indicating the established driving indicator of the driver of the vehicle in relation to other drivers, wherein the established driving indicator comprises an estimated stress level of the driver.

11. A network node for notifying a driver of a vehicle about his or her driving, the network node comprising:
a memory; and
a processor coupled to the memory, the processor configured to:
receive vehicle related information from a communication device capable of receiving data from a data collector of the vehicle, wherein the data collector is configured to obtain the vehicle related information from one or more sensors on the vehicle;
process the vehicle related information to establish a driving indicator of a driver of the vehicle in relation to one or more other drivers, wherein processing the vehicle related information comprises calculating a driving indicator of the driver of the vehicle based on the vehicle related information and comparing the calculated indicator to driving indicators established for one or more drivers of a respective vehicle located within a first distance of the vehicle, and wherein the driving indicator comprises an estimated stress level of the driver; and
transmit to the communication device data indicating the driving indicator of the driver of the vehicle in relation to other drivers.

12. The network node as claimed in claim 11, wherein the processor is further configured to:
receive complementary information and process the complementary information in the establishing of the driving indicator of the driver of the vehicle in relation to other drivers.

13. The network node as claimed in claim 12, wherein the complementary information comprises one or more of: speed limit of road, weather conditions, current road utilization, road condition, road age, a specific highway, a specific part of a city or a country, information about road works, parades, demonstrations, drivers in the same sex/age group, and similar road conditions.

14. The network node as claimed in claim 11, wherein the vehicle related information comprises one or more of: speed of vehicle, location of vehicle, fuel consumption of vehicle, proximity of vehicle to other vehicles, music played on a radio of the vehicle, and communication device use.

15. The network node as claimed in claim 11, wherein the vehicle related information comprises at least the speed of the vehicle and wherein the processor is further configured to:
calculate a number of fluctuations of the speed of the vehicle, wherein a fluctuation is a speed variation larger than a threshold value; and
rank the driving indicator of the driver in relation to a driving indicator of one or more other drivers based on the number of fluctuations of speed of the vehicle.

16. The network node as claimed in claim 11, wherein the processor is further configured to repeat the receiving and processing for a number of communication devices, and store the data of driving indicators of drivers of vehicles in a database.

17. The network node as claimed in claim 16, wherein the processor is further configured to transmit, to the communication device, routing information generated based on the stored data, wherein the routing information comprises suggested routes based on an aggregated stress level of drivers on the respective routes.

* * * * *